Dec. 20, 1955 H. L. RICHARDSON 2,727,586
GAS CLEANING DEVICE
Filed Feb. 1, 1954 4 Sheets-Sheet 1

INVENTOR
HARRY L. RICHARDSON.

BY Harold T. Stowell

ATTORNEY

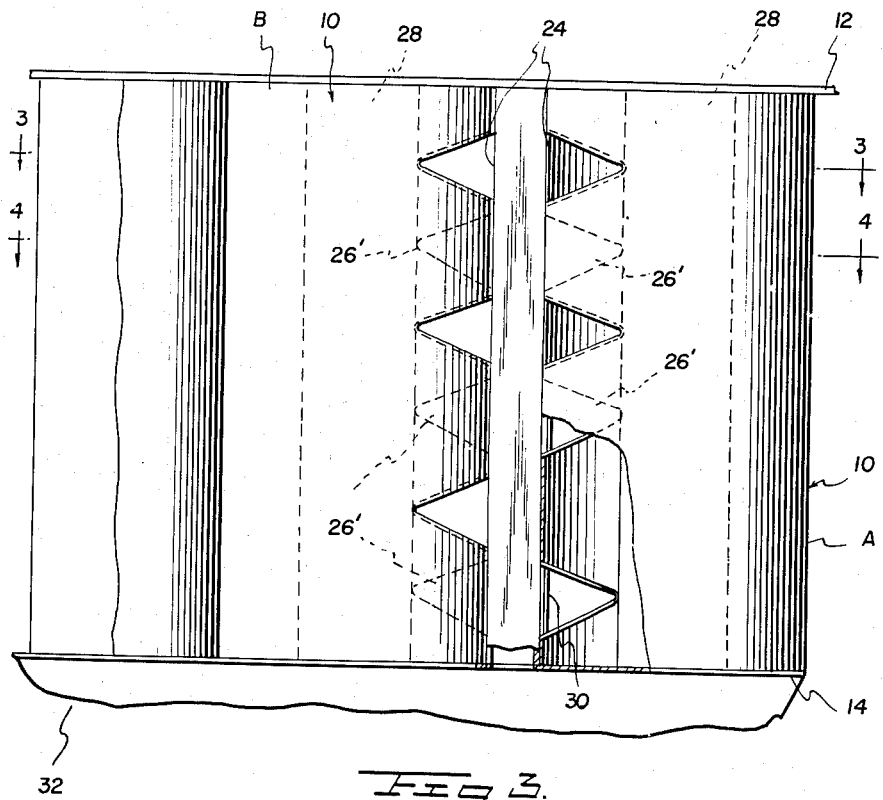
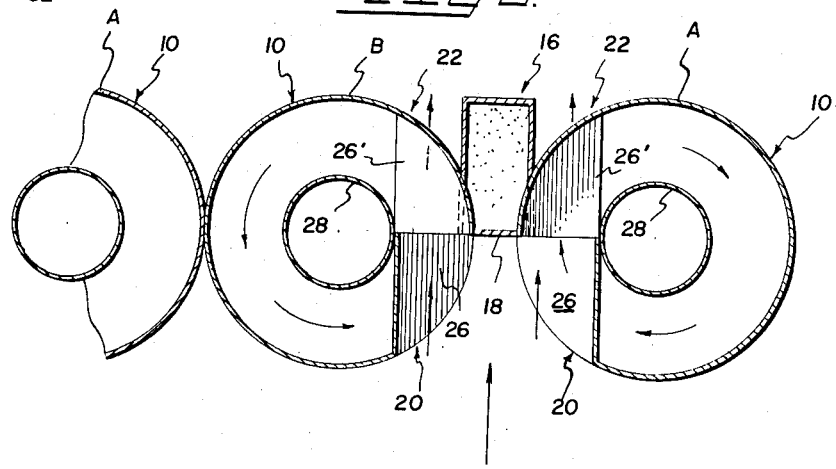

Dec. 20, 1955
H. L. RICHARDSON
2,727,586
GAS CLEANING DEVICE
Filed Feb. 1, 1954
4 Sheets-Sheet 3
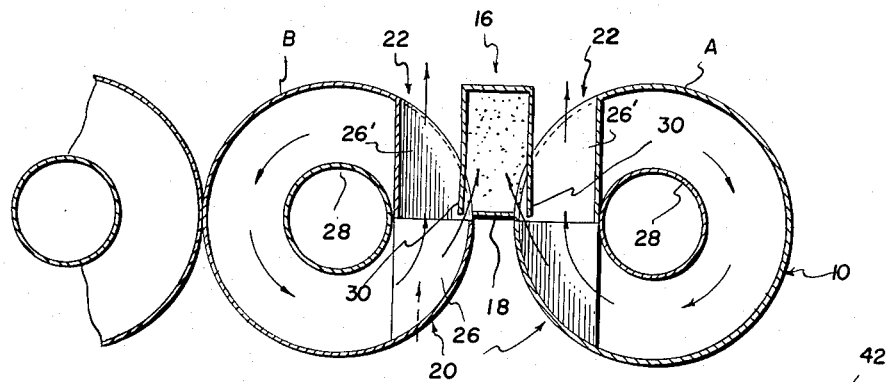
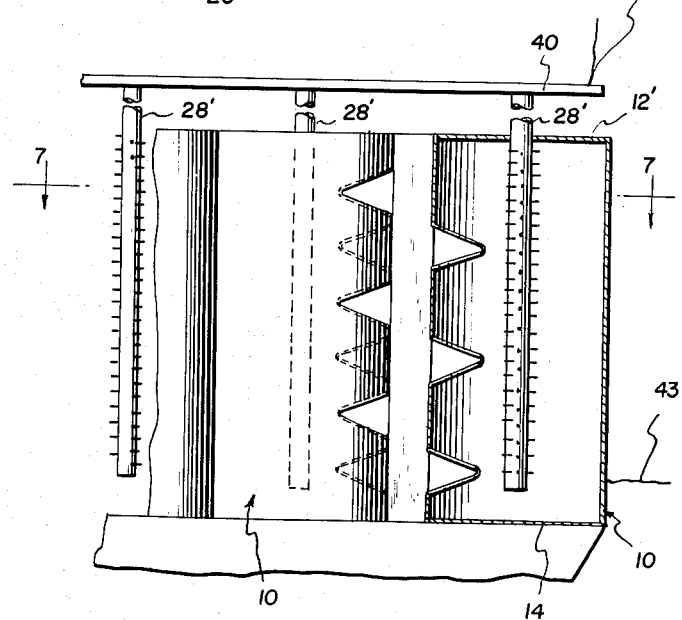
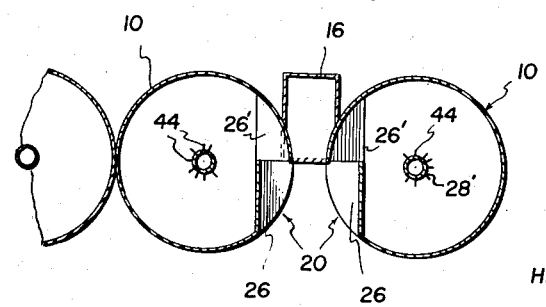
INVENTOR
HARRY L. RICHARDSON.
BY *Harold T. Stowell*
ATTORNEY Dec. 20, 1955  H. L. RICHARDSON  2,727,586
GAS CLEANING DEVICE
Filed Feb. 1, 1954  4 Sheets-Sheet 4
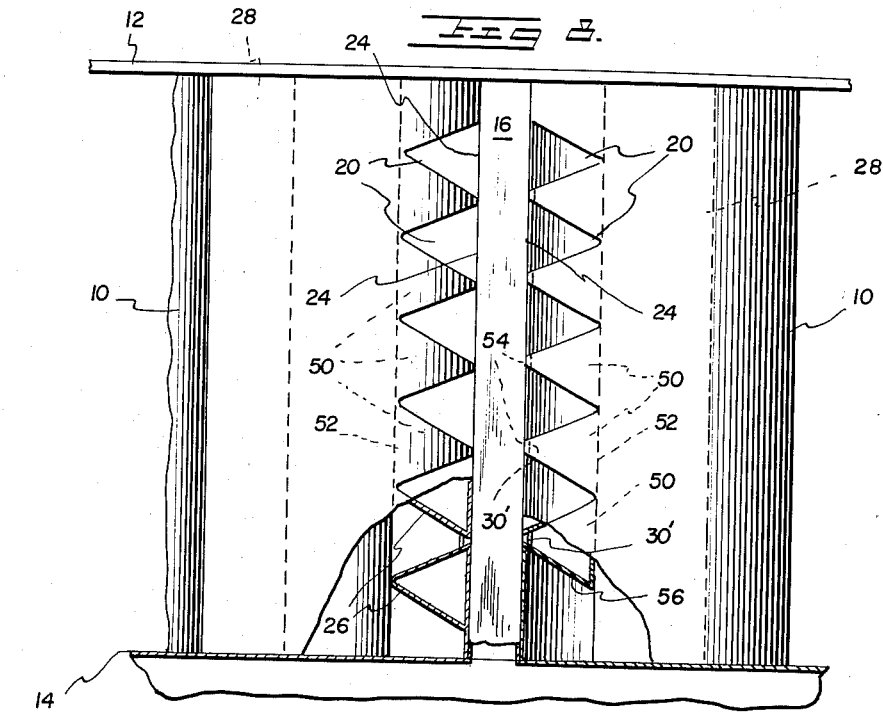
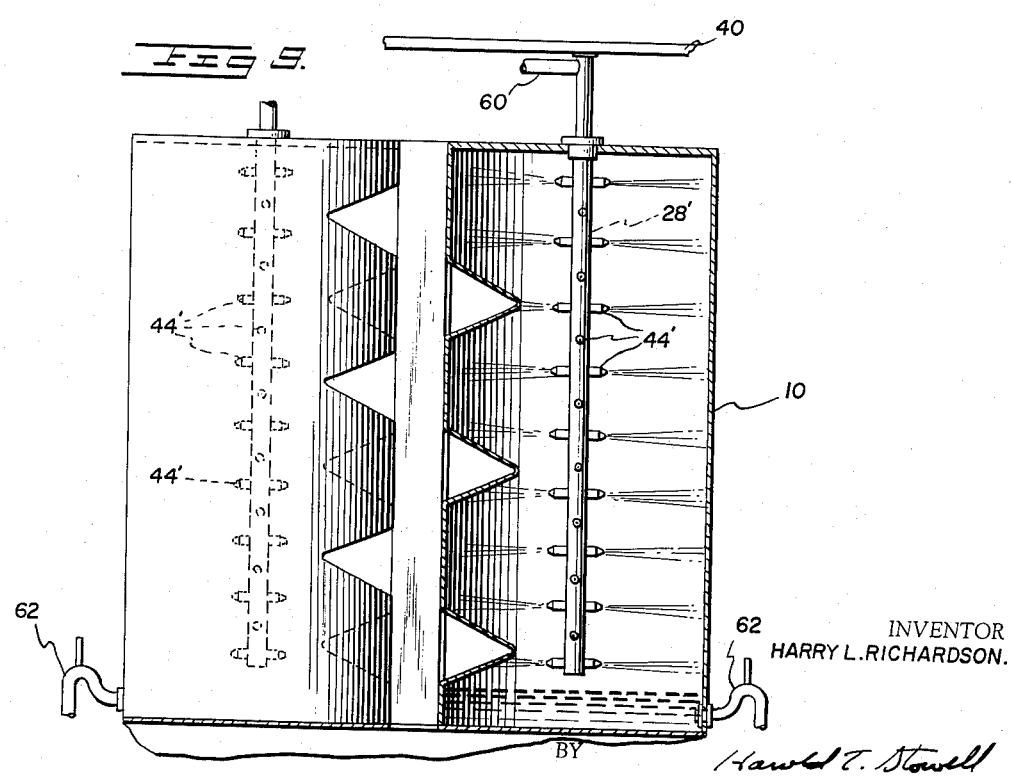
INVENTOR
HARRY L. RICHARDSON.
ATTORNEY

United States Patent Office 2,727,586
Patented Dec. 20, 1955

2,727,586

GAS CLEANING DEVICE

Harry L. Richardson, Pittsburgh, Pa., assignor to Research Corporation, New York, N. Y., a corporation of New York Application February 1, 1954, Serial No. 407,335

12 Claims. (Cl. 183—82)

This invention relates to apparatus for the removal of solid particles from gases and more particularly to new and improved gas cleaning apparatus of the skimmer concentrator type.

It is an object of the invention to provide such a device that is very efficient, simple as to its parts and relatively inexpensive to manufacture.

A further object is to provide apparatus for separating suspended particles from gases wherein each pair of separating chambers has a common dust receiving duct.

A further object is to provide such a device having dirty gas inlets and clean gas outlets in a common plane whereby the apparatus is very suitable for installation in gas conduits.

A further object is to provide such a device that may be readily modified for electrostatic particle separation to augment the centrifugal particle separation.

These and other objects and advantages are provided by the apparatus for separating suspended particles from gases which generally comprises a pair of parallel cylindrical casings, cylindrical wall means within each of said casings and defining therewith a gas chamber, end closure means for said gas chambers, each of said casings having a plurality of tangential inlets longitudinally spaced along the periphery thereof and a plurality of tangential outlets longitudinally spaced along the periphery thereof in alternating longitudinal position with respect to said tangential inlets, the tangential outlets being circumferentially displaced with respect to the inlets, a common dust hopper disposed adjacent said casings and having inlet openings communicating with said tangential outlets, and skimmer members projecting into said tangential outlets to divert a minor portion of the gas stream therein into said common dust hopper.

The invention will be more particularly described with reference to the illustrative embodiments wherein:

Fig. 2 is an enlarged elevational view with portion broken away of a pair of the collectors shown in Fig. 1;

Fig. 3 is a section on line 3—3 of Fig. 2;

Fig. 4 is a section on line 4—4 of Fig. 2;

Fig. 6 is an elevational view in partial section of a modified form of the invention;

Fig. 7 is a section on line 7—7 of Fig. 6;

Fig. 8 is an elevational view in partial section of another form of the invention; and Fig. 9 is an elevational view in partial section of still another form of the invention.

Figure 1:
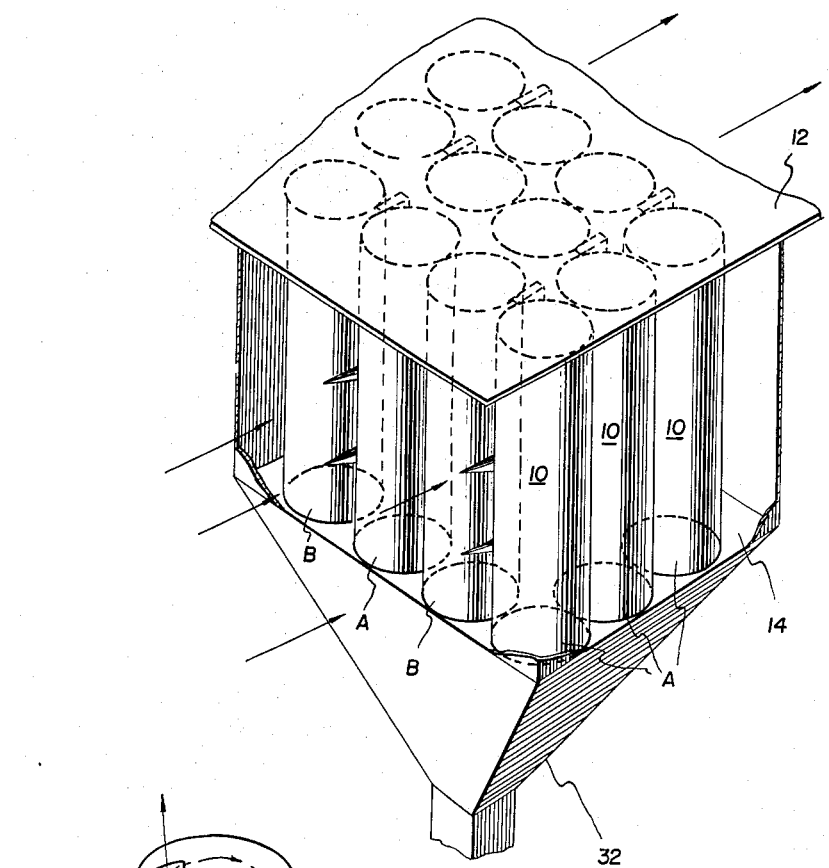
Fig. 1 is a fragmentary perspective view of a typical gas cleaning device constructed in accordance with the teaching of this invention.

With reference to the drawings and in particular Figs. 2 through 5, the separator of the invention has a cylindrical shell 10 provided with a top closure member 12 and bottom closure member 14. In installations where a plurality of the gas cleaning units are employed the cylindrical shells may be provided with common top and bottom closures as shown in the drawings or each unit may have an individual circular cover plate. In the former arrangement it will be seen that the top and bottom closure members 12 and 14 also provide two of the sides of the gas duct which directs the flow of gas to and from the separators.

The collecting cylinders are arranged in pairs and complementary collectors of each pair are designated A and B in the drawings. The collectors A and B are laterally spaced to receive a common dust chute or off-take duct 16.

The dust chutes 16 are preferably rectangular in shape, extend the entire length of the shells 10 and are in abutting relation with the sides of the shells. The ducts 16 as more clearly shown in Figs. 3 and 4 are preferably positioned so that the wall 18, the outside of which faces in a direction toward the gas flow, lies within a plane passing through the centers of cylindrical shells 10.

Each of the shells A and B are provided with a plurality of tangential gas inlets 20 longitudinally spaced along the periphery thereof and a plurality of tangential outlets 22 spaced along the periphery of the shells in alternating longitudinal position with respect to the tangential inlets 20.

The tangential inlets 20 are triangular in shape with their bases 24 parallel to the axis of the cylinders. Each opening has a substantially triangular shaped duct member 26 flush with the exterior surface of the shell 10 and extending inwardly thereof and terminating at a plane passing through the centers of the shells A and B. The apex of each of the triangular inlets 20 and the ducts 26 is positioned substantially parallel to the gas flow entering the cylindrical shell.

Within each of the shells 10 is a concentric cylinder 28 which is longitudinally co-extensive with the outer shell 10. The two cylinders 10 and 28 define an annular gas treating passage which communicates with the inlet and outlet openings in the outer cylinder. In the preferred form of the invention the inner edge of the apex of each of the ducts 26 contacts the outer surface of inner cylinder 28. Thus the gas flow to the collectors is divided into a plurality of separate gas streams which are directed into the annular path betweeen the inner and outer cylindrical members 10 and 28.

The tangential outlets 22 are formed in the same manner as the inlets above described and the duct members therefor are designated 26'. The ducts 26' direct the flow of gas which has entered the annular passage through the inlet ducts, out of the separators.

The gas leaving ducts 26' has the same direction of flow as the gas at the inlet end of the separators.

Particle skimming means 30 are provided adjacent the inner wall of the outer cylinders 10 within the longitudinal extent of each of the outlet ducts 26'. In the drawings the skimmers are shown as portions of the side walls of the dust collecting duct 16 which project through the shell 10 and into the annular passage between cylinders 10 and 28. However, it will be apparent that the skimmers could be formed from punched out portions of the shell 10, which would communicate with corresponding openings in the duct 16. The portion of the gas stream which is skimmed off is determined by the distance and angle of projection of the skimmer means 30.

The particulate material and the portion of the gas stream which is skimmed off falls or flows into a dust hopper 32 located below the collectors as shown in the drawings. The skimmed material, however, could be directed to other suitable disposal means by means of an off-take conduit connected to the lower end of duct 16.

Figure 5:
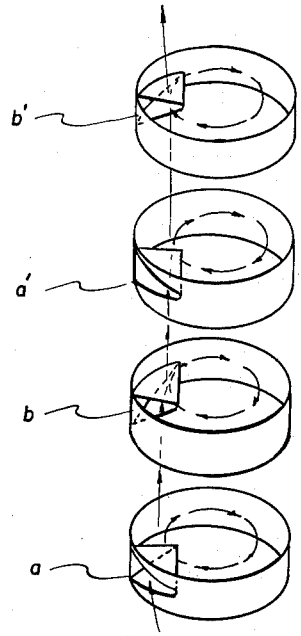
Fig. 5 is a diagrammatic view of one separator chamber of the invention showing the flow path of the gas to be cleaned.

With reference to Fig. 5 of the drawings there is shown diagrammatically the gas flow path for a skimmer collector having two inlet ducts $a$ and $a'$ and two outlet ducts $b$ and $b'$. The flow of the gas stream is shown by the arrows as entering the collector simultaneously through inlets $a$ and $a'$ and making one turn around and upwardly within the collector and leaves through outlets $b$ and $b'$ respectively. It will be evident that the described flow path will not be followed by all of the gas stream as a small portion thereof will make more than one complete turn through the collector and some of the gas entering at $a$ will leave at $b'$, however, such variances in the gas flow have been found to comprise only small portions of the total gas flow in the collectors.

While the collector of the invention has hereinbefore been described in reference to pairs of units a plurality of these units may be combined to form collectors of various capacities. One form of combination is shown in Fig. 1 of the drawings wherein 3 rows of two units each are shown in a common housing and connected to a common dust receiving hopper.

From the foregoing description it will be apparent to those skilled in the art that various modifications may be made in the separators of the invention. For example the inner cylinders 28 could be placed off center to permit collection of solids within the shell 10, the inlet ducts 26 could be constructed as a one turn helix so that the gases may be rotated 720° if desired, or the separators may be electrified. This later form of the invention is illustrated in Figs. 6 and 7 of the drawings.

Due to the substantial similarity between the electrified and non-electrified separator, elements shown in Figs. 6 and 7 are provided with the same reference numerals as applied to corresponding elements in Figs. 1 through 4.

In the electrified form of the invention shown in Figs. 6 and 7 the inner cylindrical member or electrode 28' is preferably of less diameter than the cylindrical member 28 of Figs. 1 through 4.

Members 28' are supported within the shell 10 by high tension bus bar 40 which is connected by conductor 42 to a suitable source of high voltage current. The other conductor 43 from the current source is connected to the shell 10 or the shell 10 may be connected to ground.

The diameter of the electrodes 28' and the distance which the inlet and outlet ducts 26 and 26' project into the shell 10 are so selected that adequate electrical clearance is provided between these members.

The electrodes are also terminated short of the base 14 of the shell 10 to provide proper electrical clearance, while the top 12' is constructed of insulating material such as ceramic or concrete.

Where very high voltages are employed the ducts 26 and 26' may be constructed of insulating material. In order to increase the corona discharge from the electrodes 28' a plurality of discharge points 44 are provided in their outer surfaces. As more clearly shown in Fig. 7 the discharge points 44 are not provided on that portion of the electrodes which are adjacent ducts 26 and 26'.

The operation of this form of the invention is identical with that described in reference to Fig. 1 through 4 with the added effect of the corona discharge and high voltage field which aid in throwing out and agglomerating the particulate material suspended in the gas stream to be cleaned.

In Fig. 8 of the drawings a modified form of the invention is shown wherein the base portions of the outlet ducts are positioned in reverse manner to those of the inlet ducts. Elements shown in Fig. 8 are provided with the same reference numerals as applied to corresponding elements in Figures 1 through 4. In Fig. 8 the separator has a cylindrical shell 10, top and bottom closure members 12 and 14 and dust chute 16. The dust chute 16 extends the entire length of the shells 10 and is in abutting relation with the sides of the shells.

The shells are provided with a plurality of tangential gas inlets 20 longitudinally spaced along the periphery thereof. The inlets 20 are triangular in shape with their bases 24 parallel to the axis of the cylinders. Each inlet opening has a substantially triangular shaped duct member 26 flush with the exterior surface of the shell 10 and extending inwardly thereof and terminating substantially at a plane passing axially through the centers of the shells 10. The apex of each of the triangular inlets 20 and the ducts 26 is positioned substantially parallel to the gas flow entering the cylindrical shell and remote from the dust chute 16.

Each shell also has a plurality of tangential gas outlets 50 spaced along the periphery thereof in alternating longitudinal position with respect to the tangential inlets 20. The outlets 50 are triangular in shape with their bases 52 parallel to the axis of the cylinders and remote from the dust chute 16. The apex 54 of each of the triangular outlets is positioned substantially parallel to the gas flow entering the cylindrical shell and in reverse position to the apex of each of the inlet ducts 26.

Each outlet 50 is provided with a substantially triangular shaped outlet duct 56 flush with the exterior surface of the shell 10 and extending inwardly thereof and terminating substantially at a plane passing axially through the centers of shells 10.

Within each of the shells 10 is a concentric cylinder 28 which is longitudinally co-extensive with the outer shell 10. The two cylinders 10 and 28 define an annular gas treating passage which communicates with the inlet and outlet openings. The inner edge of the apex of the inlet ducts 26, and the inner edge of the base of the outlet ducts 56 contact the outer surface of the inner cylinder 28 in the preferred form of the invention.

Particle skimming means 30' are identical in construction with particle skimming means 30 (Fig. 4) except that their longitudinal extent is less as they project into the apex end of ducts 56.

The operation of this form of the invention is like that previously described. However, the modified inlets and outlets permit a larger volume of gas to be cleaned for a given pressure drop across the device, and the skimmer collects suspended material well out of the main gas stream.

Referring to Fig. 9 a liquid spray device is shown in conjunction with the electrified form of the invention described in reference to Figures 6 and 7. In this form of the invention the hollow discharge electrode 28' is connected to a source of liquid such as water from an insulated source, not shown, or an insulating liquid such as oil could be used. The liquid sprays from modified discharge points 44' which are hollow and open at both ends.

The spray liquid collects in the base portion of the shells 10 and is removed by vented overflow outlets 62 as is well known in the art.

It will be apaprent to those skilled in the art that the spray device of Fig. 9 may be employed on the non-electrified forms of this invention and that the modified inlets and outlets described with reference to Fig. 8 could be employed on the electrified form shown in Figures 6, 7, and 9.

I claim:

1. An apparatus for separating suspended particles from gases comprising a pair of parallel cylindrical casings, cylindrical wall means within each of said casings and defining therewith a gas chamber, end closure means for said gas chambers, each of said casings having a plurality of tangential gas inlets longitudinally spaced along the periphery thereof and a plurality of tangential gas outlets longitudinally spaced along the periphery thereof in alternating longitudinal position with respect to said tangential gas inlets, the tangential gas outlets being circumferentially displaced with respect to the gas inlets, a common dust hopper disposed adjacent said casings and having inlet openings communicating with said tangential gas outlets, and skimmer members projecting into said tangential gas outlets to divert a minor portion of the gas stream therein into said common dust hopper.

2. An apparatus as defined in claim 1 wherein said gas passage is an annular chamber.

3. An apparatus as defined in claim 2 wherein said cylindrical wall member comprises a discharge electrode.

4. An apparatus as defined in claim 3 including liquid inlet means at the upper end of the discharge electrode, and liquid outlets projecting radially from said discharge electrode.

5. An apparatus for separating suspended particles from gases as defined in claim 1 wherein said tangential gas inlets and said tangential gas outlets are triangular in shape with the base portions of the triangles of each of the pair of casings in opposed parallel relation.

6. An apparatus as defined in claim 5 including duct means extending inwardly of said casings from each of the tangential gas inlets and tangential gas outlets.

7. An apparatus for separating suspended particles from gases as defined in claim 1 wherein said tangential gas inlets are triangular in shape with the base portions of the triangles of each of the pair of casings in opposed parallel relation, and said tangential gas outlets are triangular in shape with the apex of the triangles of each of the pair of casings in opposed parallel relation.

8. An apparatus as defined in claim 7 including duct means extending inwardly of said casings from each of the tangential inlets and tangential outlets.

9. An apparatus for separating suspended particles from gases comprising a pair of cylindrical parallel casings, concentric cylindrical wall means within each of said casings and defining therewith an annular gas treating chamber, end closure means for said annular chamber, each of said casings having a plurality of triangular shaped gas inlets and a plurality of triangular shaped gas outlets longitudinally spaced along the periphery thereof in alternating longitudinal position with respect to said gas inlets with the base portions of the triangles of each of the pair of casings in opposed parallel relation, a common dust hopper disposed adjacent said casings and having inlet openings communicating with said gas outlets, and skimmer members projecting into said casings adjacent said gas outlets to divert a minor portion of the gas stream therein into said common dust hopper.

10. An apparatus as defined in claim 9 wherein said cylindrical wall means are discharge electrodes and maintained at a high potential with respect to said cylindrical casings.

11. An apparatus as defined in claim 9 including V-shaped duct means for each of the triangular shaped gas inlets and gas outlets, said duct means extending inwardly of said casings from each of the gas inlets and gas outlets into contacting relation with cylindrical wall means.

12. An apparatus for separating suspended particles from gases comprising a pair of parallel cylindrical casings forming the outer walls of a pair of gas chambers, and closure means for said gas chambers, each of said casings having a plurality of tangential gas inlets longitudinally spaced along the periphery thereof and a plurality of tangential gas outlets longitudinally spaced along the periphery thereof in alternating longitudinal position with respect to said tangential gas inlets, the tangential gas outlets being circumferentially displaced with respect to the gas inlets, a common dust hopper disposed adjacent said casings and having inlet openings communicating with said tangential gas outlets, and skimmer members projecting into said tangential gas outlets to divert a minor portion of the gas stream therein into said common dust hopper.

References Cited in the file of this patent

UNITED STATES PATENTS

| 867,240 | Brunner et al. | Oct. 1, 1907 |
|---|---|---|
| 1,838,117 | Simms et al. | Dec. 29, 1931 |
| 2,546,246 | Whiton et al. | Mar. 27, 1951 |
| 2,616,520 | Feifel et al. | Nov. 4, 1952 |

FOREIGN PATENTS

| 255,948 | Switzerland | Feb. 1, 1949 |